United States Patent
Alen

(10) Patent No.: US 9,049,565 B2
(45) Date of Patent: Jun. 2, 2015

(54) METHOD THAT ENABLES DEVICES NEAR EACH OTHER TO AUTOMATICALLY EXCHANGE OWNER PROFILE INFORMATION

(71) Applicant: Anand Bernard Alen, Flower Mound, TX (US)

(72) Inventor: Anand Bernard Alen, Flower Mound, TX (US)

( * ) Notice: Subject to any disclaimer, the term of this patent is extended or adjusted under 35 U.S.C. 154(b) by 0 days.

(21) Appl. No.: 13/970,538

(22) Filed: Aug. 19, 2013

(65) Prior Publication Data

US 2014/0057550 A1    Feb. 27, 2014

Related U.S. Application Data

(60) Provisional application No. 61/692,097, filed on Aug. 22, 2012.

(51) Int. Cl.
*G06F 15/16* (2006.01)
*H04W 4/06* (2009.01)
*H04L 29/08* (2006.01)
*H04W 4/02* (2009.01)
*H04W 4/20* (2009.01)

(52) U.S. Cl.
CPC .............. *H04W 4/06* (2013.01); *H04L 67/306* (2013.01); *H04W 4/021* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 7,974,877 B2 * | 7/2011 | Ramanathan et al. | 705/14.55 |
| 2007/0053335 A1 * | 3/2007 | Onyon et al. | 370/338 |
| 2008/0014947 A1 * | 1/2008 | Carnall | 455/437 |
| 2008/0242322 A1 * | 10/2008 | Scott et al. | 455/466 |
| 2009/0187466 A1 * | 7/2009 | Carter et al. | 705/10 |
| 2010/0257239 A1 * | 10/2010 | Roberts | 709/204 |
| 2011/0010245 A1 * | 1/2011 | Priebatsch et al. | 705/14.58 |
| 2011/0294425 A1 * | 12/2011 | Coffing | 455/41.2 |
| 2011/0307380 A1 * | 12/2011 | Ido | 705/44 |
| 2012/0294199 A1 * | 11/2012 | Anchan | 370/277 |
| 2012/0310744 A1 * | 12/2012 | Kim et al. | 705/14.65 |
| 2013/0072229 A1 * | 3/2013 | Schnurr | 455/456.1 |
| 2013/0079037 A1 * | 3/2013 | Dobyns | 455/456.3 |
| 2013/0091209 A1 * | 4/2013 | Bennett et al. | 709/204 |
| 2013/0108071 A1 * | 5/2013 | Huang et al. | 381/77 |
| 2013/0229930 A1 * | 9/2013 | Akay et al. | 370/252 |
| 2013/0267171 A1 * | 10/2013 | Sarkar et al. | 455/41.1 |
| 2013/0346208 A1 * | 12/2013 | Bouret et al. | 705/14.64 |

* cited by examiner

*Primary Examiner* — Kenny Lin
(74) *Attorney, Agent, or Firm* — Jie Tan; JTLaw Services, PC

(57) ABSTRACT

A method for devices that are near each other to exchange owner profile information. Upon entering an area where inter-device communication with nearby devices is possible, a key is exchanged among all participating devices in the area and subsequently owner profile information is synchronized between devices. All devices also maintain a count of how often a specific owner profile and so its owner was encountered.

17 Claims, 1 Drawing Sheet

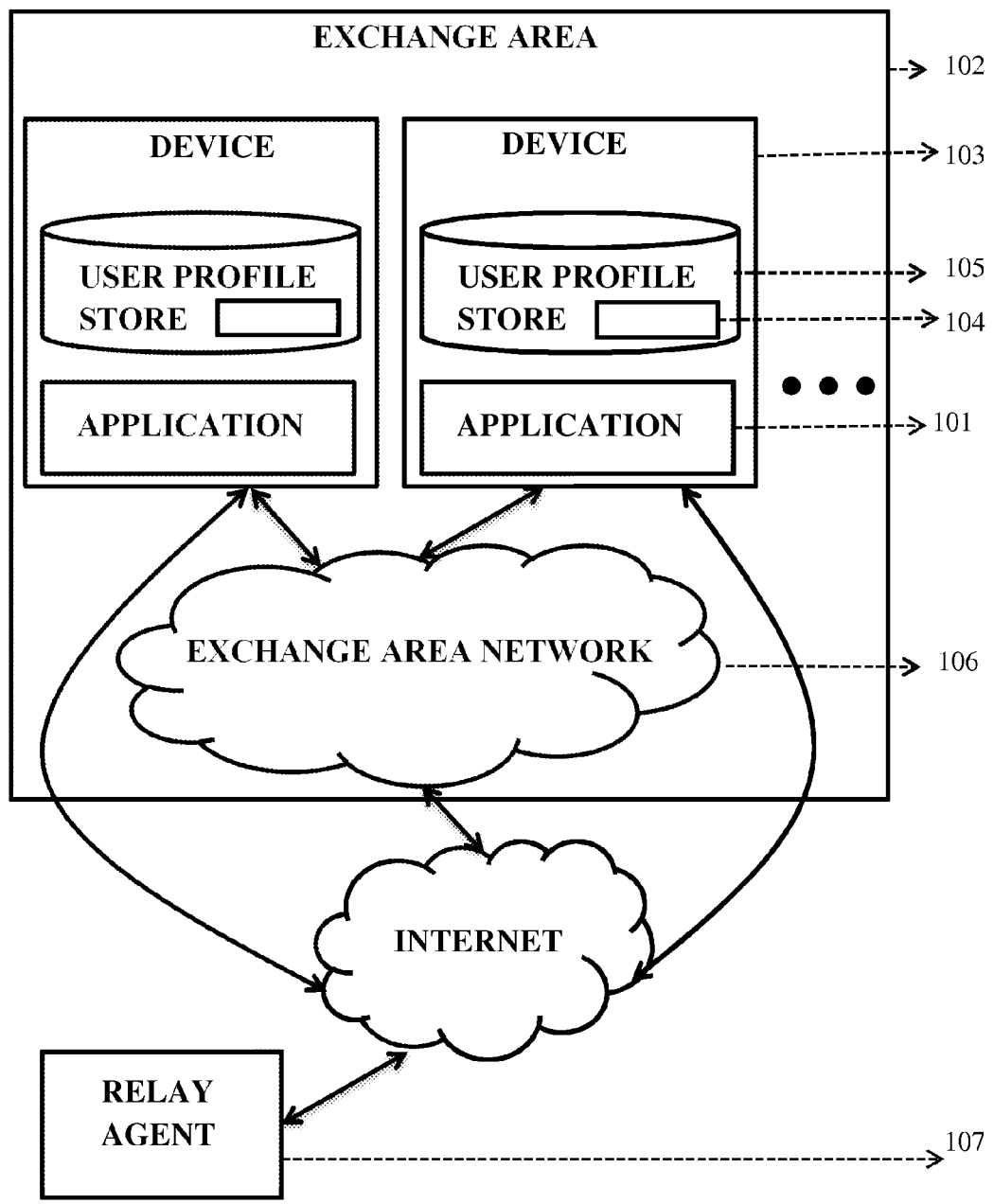

METHOD THAT ENABLES DEVICES NEAR EACH OTHER TO AUTOMATICALLY EXCHANGE OWNER PROFILE INFORMATION

FIELD OF THE INVENTION

The present invention relates generally to electronic mobile devices while has applications to fixed electronic devices as well. More specifically it relates to devices that are considered personal devices or devices that have a personal or business profile associated with it.

PROVISIONAL PATENT REFERENCE

Problem statement, abstract, drawing and detailed description of the solution was filed as a provisional patent on Aug. 22, 2012 by this inventor with application No. 61/692,097. A realized embodiment of this provisional patent was created by this inventor and is available as a published mobile application described at http://www.usocialnet.com/smalltown.

BACKGROUND OF THE INVENTION

Small business owners and active professionals would like a method to make people near them aware of the services they provide regardless of where they are. This is accomplished in a limited fashion by wearing uniforms, badges and logo-printed shirts and operating logo-printed vehicles. This method of communication reaches a human prospect who would then have to make a note of the encountered service provider's services and contact information. A more effective method would be to electronically broadcast profile information which is then directly saved onto devices of other people nearby. Then that information is made available when the owner of that device is specifically looking for such information. For example, instead of a new neighborhood store sending out pamphlets for human consumption, the invention here allows for a device owned and controlled by them to broadcast profile information which can be consumed by other nearby devices including a passing vehicle's navigation system. Then this information is available when a human user of the navigation system is actually looking for such a business. In another example, this invention enables a service provider's device when entering a Wi-Fi enabled coffee shop automatically broadcasts the service provider's profile information which is then received by devices of other users in that coffee shop and stored for later retrieval. As profile content enters the device without human intervention, it is non-intrusive and is more effective. All participating devices associate encountered profiles with the location they were encountered at and count the number of times the same profile and so the same user was encountered.

The Problem Solved:

There is no automatic electronic method to let people around you know who you are and what services you can provide or your interests, hobbies and contact information. In online social networks that exist today tagging of friend profiles as "social", "work", or "family" is a manual process. There is no method to automatically rank profiles of friends by frequency of encounter in real life.

SUMMARY OF THE SOLUTION

When a device that implements this invention enters an area where there are other devices nearby, the device automatically broadcasts its owner's user profile for consumption by the other devices; saves encountered user profiles of other users broadcast by other devices; associates encountered user profiles with the location they were encountered; and maintains a count of how often a specific user was encountered.

The automatic nature of this invention allows the user to go about his or her business without being actively involved in his or her device transmitting and collecting profile information.

Storing such profiles with received location allows for automatic segregation of social contacts, such as "work-buddies", "flat-mates" etc.

Maintaining a count of how often a profile is encountered enables automatic ranking of social contacts, such as "best work-buddy".

DESCRIPTION OF THE DRAWING AND COMPONENTS OF THE INVENTION

The drawing includes several components of the invention. The components are described below:

Application (101):

This is a mobile or fixed software application that executes on the electronic device (103). By showing only one instance in the drawing there is no intent to imply that this is built as a single piece containing all functions or that only a single copy can reside on a device (103). For the larger purpose of describing this invention, it suffices to state that there is a software application on the device (103) that implements the methods described in this invention, regardless of the manner in which such an application may be designed and deployed.

Exchange Area (102):

For the purposes of this specification and the appended claims, the description of an exchange area is as follows: The physical place, generally a well-defined geographic area such as a shopping mall, restaurant, park, airport, house or office where devices may enter and may leave. Exchange areas can also host fixed devices that never leave. Exchange area allows for the concept of containment of devices such as to say, "devices that are in the exchange area". Exchange areas may be named by a place name, such as "DFW Airport", have a street address or be identified by the identity or name of the communication network they may contain.

Device (103):

For the purposes of this specification and the appended claims, the description of a device is as follows: This is an electronic device such as a mobile phone, tablet, vehicle on-board computer or navigation system, mobile laptop computer, a fixed personal computer or a custom device created to implement this invention. What is characteristic of this device is that it has a person's or a businesses' profile associated with it. If there are multiple profiles associated with this device, one profile is the primary profile that represents the device or for all purposes of this invention such a device can manifest itself to other functions in this invention as separate devices each associated with a singular profile. These devices may enter and may leave an Exchange Area (102). These devices may also be fixed and never leave an Exchange Area (102). For the purposes of this invention, such fixed devices will be treated as devices that enter the Exchange Area (102) but never leave.

User Profile (104):

For the purposes of this specification and the appended claims, the description of a user profile is as follows: A collection of significant parameters about the user, such as a name, occupation, interests or hobbies, contact information, who they would like to meet—for instance, "I'd like to meet inventors or investors"—and a brief introduction to themselves and/or the services they provide. Not all information is required to be present in all profiles. Alternately, the User Profile could merely be or contain a reference (such as an URI) to the user's public profile available online on the Internet on social networking sites, job-boards etc. Note that User Profile and Owner Profile are used interchangeably in this document.

User Profile Store (105):

For the purposes of this specification and the appended claims, the description of a user profile store is as follows: User Profiles (104) are stored in the User Profile Store on the Electronic Device (103). This store contains the profile of the owner of the device and profiles of other users encountered in exchange areas as described in this invention.

Exchange Area Network (106):

For the purposes of this specification and the appended claims, the description of an Exchange Area Network is as follows: The communication network that is available to devices that are in the Exchange area (102) that allows for the devices to communicate with each other and/or communicate with the Internet or a network external to the exchange area network. This communication network could be contained wholly in the Exchange area (102) such as a Wi-Fi network or the communication network could be part of a broader WAN network with scoping capability to limit messaging within this network such as devices that are on the same virtual LAN, femto or pico-cell. Exchange Area Network is optional for this invention. An Exchange area (102) may exist without an Exchange Area Network (106) where devices (103) in the exchange area reach the Internet directly through mechanisms contained in the device itself such as a data channel on a mobile phone.

Relay Agent (107):

For the purposes of this specification and the appended claims, the description of relay agent is as follows: A relay agent is used when the exchange area network does not allow devices in the exchange area network to communicate directly with each other, such as client isolated Wi-Fi zones. A relay agent is also be used when an Exchange Area (102) does not have an Exchange Area Network (106) at all.

DETAILED DESCRIPTION OF THE INVENTION

In its most likely embodiment the invention is implemented as a software application (101) that runs on a stationary or mobile device (103). The workings of the application are as follows:

The software application (101) allows for the user of the device (103) to create and modify a user profile (104) that will be used when user profile (104) is communicated to nearby devices.

Upon creation of the user profile, the software application (101) generates a profile identifier called "profile-id" that has two parts, one part identifying the user, "user-id" and another part that identifies a version of the user profile, "version-id".

When the user modifies the user profile, the user-id remains the same but the version-id is modified, resulting in a modified profile-id signaling that the user has updated the profile.

For the purposes of this invention, when the user's device (103) enters an exchange area, so does the user.

The software application (101) detects entry of the user's device (103) into an exchange area (102). An example is a person with a mobile phone enters a Starbucks that has public Wi-Fi access where it can communicate with other mobile devices in the Wi-Fi network.

Methods used to detect entry of the user's device (103) into an exchange area (102) by detecting the presence of a communication network in the exchange area (102) is known to those in the art and is used but not described in this invention.

Alternately the software application (101) may detect that the user's device has entered an exchange area (102) by merely recognizing its current geographic location as being within the confines of the exchange area.

Methods used to map the geographic location of the device to a place name or a street address that contains the location is known to those in the art of creating location aware mobile applications and is used but not described in this invention.

When an exchange area (102) contains an exchange area network (106), this communication network can be one of many types:

(1) A Broadcast Enabled Wi-Fi Network:

In this type of communication network, the devices are allowed to send an Internet Protocol broadcast message that can be received by other devices configured to receive this broadcast. In this case the exchange area network is directly used in this invention to communicate between devices.

(2) A Multicast Enabled Wi-Fi Network:

In this type of communication network, the devices are allowed to send an Internet Protocol multicast message to a multicast group IP address and a port number. Devices subscribe to this multicast group IP and listen on that port number to receive messages. In this case the exchange area network is directly used in this invention to communicate between devices.

(3) Client-Isolated Wi-Fi Network:

In this type of Wi-Fi network devices are not allowed to see and communicate with each other directly using the Wi-Fi network. When the software application (101) learns that the device (103) has entered such an exchange area (102), the application uses a relay agent (107) executing on the Internet to communicate with other devices in the exchange area (102).

When the exchange area (102) does not contain an exchange area network (106), a wide area network generally available to the devices in that area serves as the communication network between devices in the exchange area (102). In this case the software application (101) may detect that the user's device has entered an exchange area by merely associating its current geographic location as being within the confines of the exchange area (102).

Upon entry into an exchange area (102) the mobile device (103) exchanges messages to communicate user profile (104) to other devices in that exchange area (102) as described in the following several paragraphs:

If the exchange area (102) is served by an exchange area network (106) that is a broadcast capable or multicast capable Wi-Fi network, the software application (101) periodically, separated by a period of time, broadcasts the profile-id over the Wi-Fi network.

The periodic broadcast is for the benefit of new devices that may enter the exchange area after the current broadcast is done or to accommodate packet losses that are possible when broadcasting or multicasting messages in an unreliable fashion over an IP network.

As those skilled in the art will appreciate, application specific broadcasts are implemented as multicast messages that target a pre-defined multicast IP address and port number. Devices that participate in this invention subscribe to and listen on this multicast IP address and port number.

Participating devices receive this broadcast and request user profile from the broadcasting device (103).

Broadcasting device (103) supplies user profile (104) to devices that request user profile.

If the exchange area network is a client isolated Wi-Fi network as described in or if an exchange area contains no exchange area network as described in [0030], then the device that enters the exchange area publishes the profile-id along with the user profile and the location of the exchange area onto a relay agent on the Internet.

The location of the exchange area supplied along with the publication of the profile-id could be of the following:

(1) the geographic location of the device converted to a place name by using a service available on the Internet and the place name supplied as the location.

(2) the geographic location of the device converted to a place address by using a service available on the Internet and the address supplied as the location.

(3) the geographic location itself specified as latitude and longitude.

(4) the BSSID of the client isolated Wi-Fi network if the device providing the profile-id to the relay agent is in a client isolated Wi-Fi network.

(5) a collection of SSIDs of Wi-Fi networks visible to the device in the exchange area.

(6) a collection of SSIDs whose Wi-Fi signal strength is above a preset threshold as seen by the device in the exchange area.

All participating devices in a client isolated Wi-Fi network as described in [0029] or in an exchange area that contains no exchange area network as described in [0030], periodically query the relay agent (107) for profile-ids associated with the location of the exchange area they are currently in.

The location provided in the query is of one of the forms in [0039], [0040], [0041], [0042], [0043] or [0044].

The relay agent (107) responds to this query with a list of profile-ids associated with the location provided in the query in the following manner:

(1) If the location provided is a place name, the relay agent returns all profile-ids that included that place name when the profile-id was published with the relay agent.

(2) If the location provided is a place address, the relay agent returns all profile-ids that included that place address when the profile-id was published with the relay agent.

(3) If the location provided is a latitude and longitude pair, the relay agent returns all profile-ids that included a latitude and longitude when the profile-id was published with the relay agent such that the distance between the two latitude, longitude pairs is less than a preset and fixed distance.

(4) If the location provided is a BSSID, the relay agent returns all profile-ids that included a BSSID when the profile-id was published with the relay agent.

(5) If the location provided is a collection of SSIDs, the relay agent returns all profile-ids that included a list of SSIDs such that there is at least a preset number of SSIDs that are both in the query and in the list of SSIDs published with the profile-id.

All devices that receive profile-id broadcast directly from the broadcasting device or from the relay agent (107) maintain a count of how often a specific user identified by the user-id portion of the profile-id is encountered.

This count is saved with the user profile (104) for that user on the device (103).

This count is key to the value of the invention as it is used to create a "friendship-rank". Users who are encountered more often have a higher friendship-rank.

All devices that receive profile-id broadcast directly from the broadcasting device or from the relay agent (107) save the location of the exchange area (102) where the profile-id was encountered along with the user profile (104).

This location of the exchange can take several forms as described below:

(1) the geographic location of the device receiving the profile-id broadcast converted to a place name by using a service available on the Internet and this place name used as the location.

(2) the geographic location of the device receiving the profile-id broadcast converted to a personal place name by using a database available to the device and this personal place name used as the location. Examples of these personal place names are: "home", "work", "church" and such.

(3) the geographic location of the device receiving the profile-id broadcast converted to a place address by using a service available on the Internet and this address used as the location.

(4) the BSSID of the Wi-Fi network if the exchange area (102) contains an exchange area network (106) that is a Wi-Fi network.

(5) the SSID of the Wi-Fi network if the exchange area (102) contains an exchange area network (106) that is a Wi-Fi network.

(6) Where the exchange area (102) contains an exchange area network (106) that is a Wi-Fi network, obtaining the BSSID and then transcribing the BSSID to a personal place name using a pre-provisioned database created for that purpose which is available to the device.

(7) Where the exchange area (102) contains an exchange area network (106) that is a Wi-Fi network, obtaining the SSID and then transcribing the SSID to a personal place name using a pre-provisioned database created for that purpose which is available to the device.

Storing the location name (however computed) is key to the invention as it enables the Software Application (101) to automatically segregate social contacts by way of their encountered profiles into appropriate contexts, such as "work-buddy", "flat-mate", "social-friend" etc. For example, profiles that a device (103) repeatedly encounters or encounters at certain times of day when the device (103) is in the home could automatically be classified as "immediate family".

To illustrate the value of this invention, this social contact segregation could be further refined by use of the "friendship-rank" counter described earlier. In-conjunction they provide sorted lists, such as "best-work-buddy". The device (103) would encounter the buddy's device not just at the work network which is an exchange area (102) but also at the local restaurant's Wi-Fi network (in another exchange area) as they have lunch together. Tracking the friendship-rank and the automatic segregation by way of capturing where a profile is encountered enables the Software application (101) to even detect couples that work together.

In addition to the immediate value of learning of encountered profiles and so people, the functions of automatic friendship-ranking and automatic segregation of social contacts serve as powerful building blocks for context sensitive intelligent applications.

For the sake of context and completion the following functions of the software application (101) are listed:

The Software Application (101) displays a list of encountered user profiles (104) that are in the current exchange area (102).

The Software Application (101) allows the user to see a list of all encountered user profiles (104) in the past in all exchange areas or a specific exchange area.

The Software Application (101) allows users to search for encountered user profiles (104) that contain a specific keyword.

The Software application (101) allows users in an exchange area (102) to initiate chat requests with each other and upon approval chat with each other via the Software Application (101).

The Software application (101) allows users to exchange or update contact information automatically upon encounter.

The Software Application (101) allows users to configure alerts for future encounters.

The Software Application (101) detects when the device (103) has left the exchange area (102) and communicates that information to the relay agent (107) if a relay agent was used to communicate with other devices in the exchange area (102).

This disclosure is intended to explain how to fashion and use various embodiment in accordance with the invention rather than to limit the true, intended and fair scope and spirit thereof. The foregoing description is not intended to be exhaustive or to limit the invention to the precise form disclosed. Modifications or variations are possible in light of teachings in the Specification. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

What is claimed is:

1. A method by which a device communicates a user profile of a user to an other device in an exchange area, the method comprising the steps of:
    defining the user profile on the device with parameters comprising
        a user name,
        an occupation of the user,
        an interest of the user,
        a service provided by the user,
        a description of people that the user would like to meet,
        a brief introduction of the user,
        a contact information of the user,
        a reference to a Uniform Resource Identifier (URI) of a profile of the user resident outside the device,
        a photo of the user;
    said device, upon entry into the exchange area broadcasting repeatedly, each broadcast separated from the next by a period of time, a profile-id that is a constructed data type containing information about the user and the user profile;
    the other device in the exchange area receiving a profile-id broadcast from said device;
    the other device in the exchange area, upon receipt of a profile-id broadcast, requesting the user profile from said device if not already requested;
    said device communicating the user profile to the other devices in the exchange area that request the user profile from said device;
    the other device in the exchange area receiving and storing the user profile of said device as a stored user profile;
    the other device, upon receipt of the profile-id broadcast, incrementing a tracking counter of encounters of the profile-id; and
    the other device ranking the user of the profile-id based on the tracking counter of encounters of the profile-id.

2. The method in claim 1 further comprising: the other devices upon receipt of the profile-id broadcast storing the location of the exchange area along with the stored user profile; and enabling automatic segregation of encountered users by location.

3. The method in claim 2 wherein the location of exchange area stored along with the received user profile is a place name.

4. The method in claim 2 wherein the location of exchange area stored along with the received user profile is a place address.

5. The method in claim 2 wherein the location of exchange area stored along with the stored user profile is the BSSID of a Wi-Fi network deployed in the exchange area.

6. The method in claim 2 wherein the location of exchange area stored along with the stored user profile is the SSID of a Wi-Fi network deployed in the exchange area.

7. The method in claim 1 further comprising the other devices upon receipt of the profile-id broadcast storing said tracking counter with the stored user profile.

8. The method in claim 1 wherein the profile-id broadcast is accomplished by the use of Internet Protocol broadcast over a Wi-Fi network deployed in the exchange area.

9. The method in claim 1 wherein the profile-id broadcast is accomplished by the use of Internet Protocol multicast to a specific multicast IP address and port number over a Wi-Fi network deployed in the exchange area.

10. The method in claim 1 wherein the profile-id broadcast is accomplished by said device publishing the profile-id along with the user profile and the location of the exchange area and associating the profile-id with the location of the exchange area, onto a relay agent on the Internet, followed by:
    the other device in the exchange area periodically querying the relay agent by providing the location of the exchange area for all profile-ids associated with the location;
    and as a result of the query, the other device upon finding the profile-ids associated with the location of the exchange area, retrieving each respective user profile for each returned profile-id from said relay agent provided they have not retrieved user profile for a given profile-id already.

11. The method in claim 10 wherein the location of the exchange area as supplied to the relay agent is a place name.

12. The method in claim 10 wherein the location of the exchange area as supplied to the relay agent is a place address.

13. The method in claim 10 wherein the location of the exchange area as supplied to the relay agent is defined by a latitude and longitude, said latitude and longitude being the geographic location of the device that communicates with the relay agent; and
    in responding to a query for profile-ids associated with a provided location the relay agent declares all profile-ids supplied with a location in the profile-id broadcast where such location is within a preset and fixed distance of the provided location as profile-ids associated with the provided location.

14. The method in claim 10 wherein the location of the exchange area as supplied to the relay agent by a device is the BSSID of a Wi-Fi network.

15. The method in claim 10 wherein the location of the exchange area as supplied to the relay agent is a collection of Wi-Fi network SSIDs; and
    in responding to a query for profile-ids associated with a provided location, the relay agent declares all devices that supplied in their profile-id broadcasts at least a preset number of the same SSIDs as profile-ids associated with the provided location.

16. The method in claim 15 wherein an SSID is included in the collection only if its corresponding Wi-Fi signal strength for said SSID is above a preset threshold.

17. The method in claim 10 wherein the Internet is replaced by a private network.

\* \* \* \* \*